Figure 4:
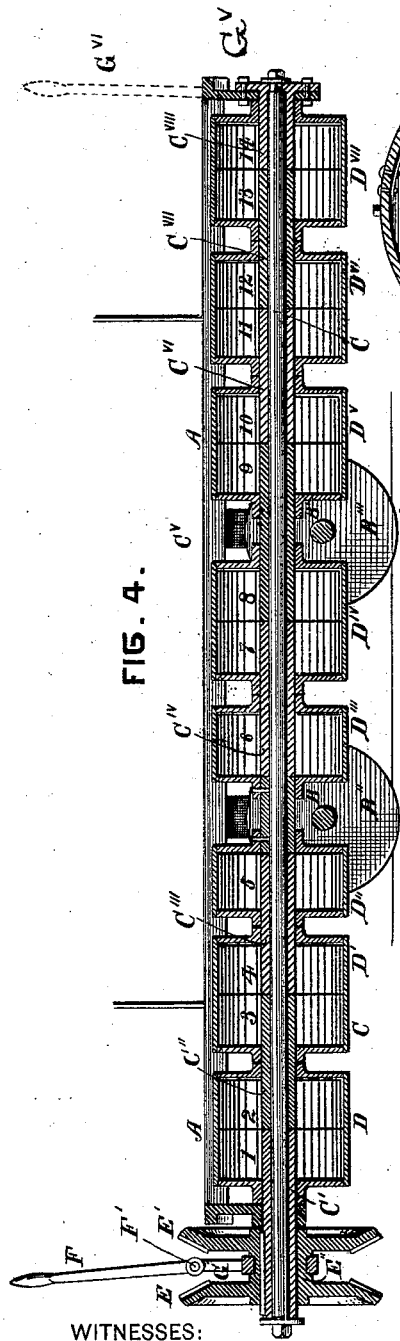

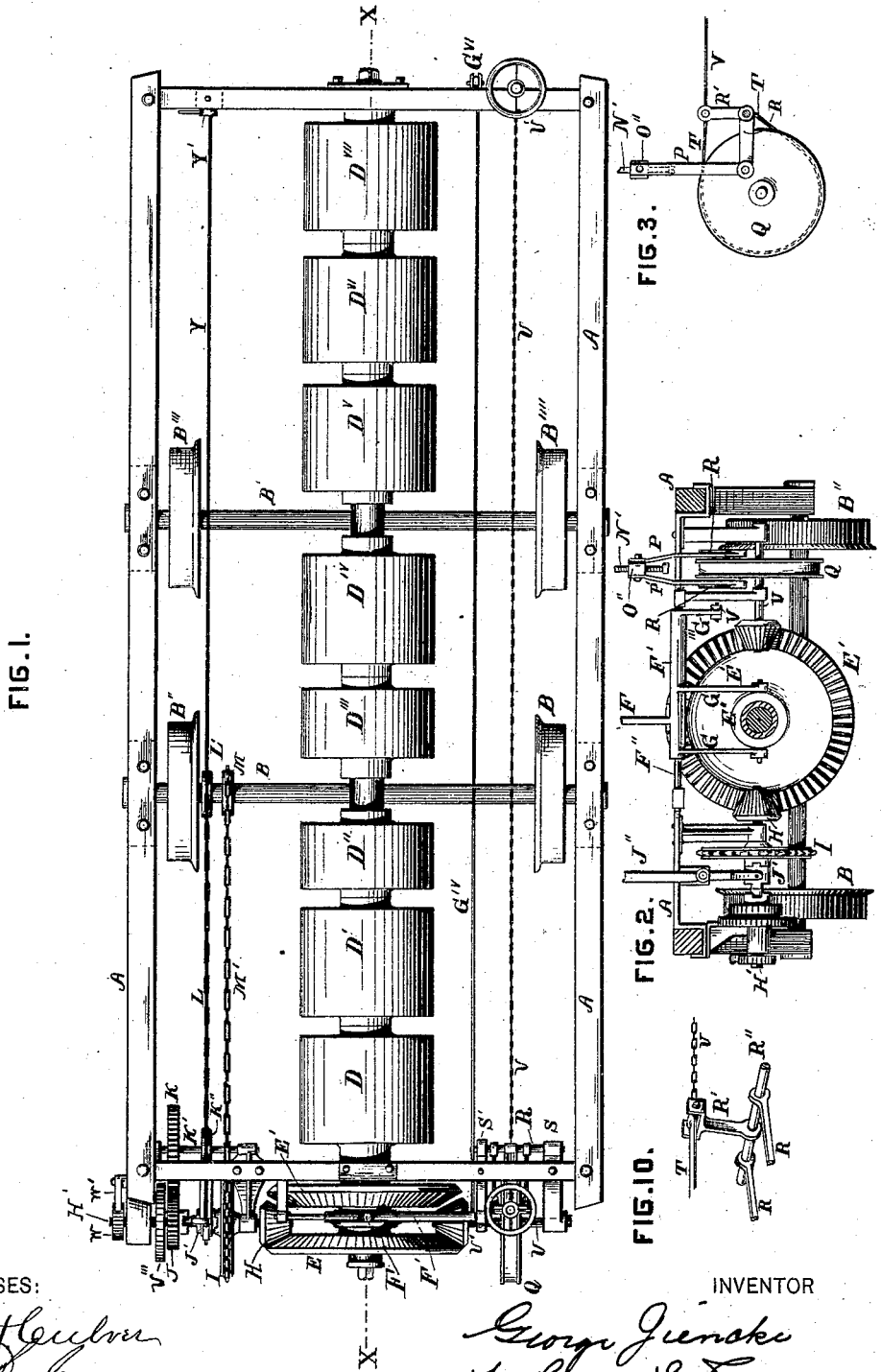

(No Model.) 2 Sheets—Sheet 2.

G. JIENCKE.
SPRING MOTOR.

No. 273,365. Patented Mar. 6, 1883.

WITNESSES:

INVENTOR
George Jiencke
per George E. Buckley
atty.

UNITED STATES PATENT OFFICE.

GEORGE JIENCKE, OF PHILADELPHIA, PENNSYLVANIA, ASSIGNOR TO THE AMERICAN SPRING CAR MOTOR COMPANY, OF CAMDEN, NEW JERSEY.

SPRING-MOTOR.

SPECIFICATION forming part of Letters Patent No. 273,365, dated March 6, 1883.

Application filed January 10, 1883. (No model.)

*To all whom it may concern:*

Be it known that I, GEORGE JIENCKE, a subject of the Emperor of Germany, at present a resident of the city of Philadelphia, State of Pennsylvania, have invented a new and useful Improvement in Spring-Motors for Street-Cars, of which the following is a full, clear, and exact description, reference being had to the annexed drawings, making part hereof.

My invention relates to spring-motors, designed most particularly to drive street-railway cars, though my device may be applied to other purposes where power is required.

It consists of a series of powerful coiled flat springs arranged within a succession of hollow drums, the alternate springs being coiled in different directions around separate hollow shafts. These hollow shafts are set upon a bearing or support consisting of a rod or rods. The springs are wound up by stationary engines placed at the termini of the road, and they expend the force stored up in them through the gearing of the wheels in propelling the car, controlled by a regulating-brake operated by the driver of the car. The whole device may be divided into six parts, viz: first, the car-trucks, the axles, and wheels; second, the springs, their connection one with another, and the gearing transmitting the power to one of the axles of the car; third, the starting-gear, to be used when an additional amount of power is required in starting or running up grades and around curves; fourth, the brake and speed-adjuster for stopping the car and, by regulating the supply of power, controlling the speed thereof; fifth, the reversing-gear for reversing the direction in which the car is traveling, and for stopping; sixth, the winding-gear. Although I name these divisions, I do not claim each separate division as my invention.

The object of my invention is to so combine the separate springs of a series of coiled springs with each other that the amount of power being given out by the whole series is equal only to the power which will be derived from one of the springs, yet the time during which the power is exerted is proportioned to the number of springs composing the series; to wit: If it will take one of the coiled springs four minutes to expend its power or to uncoil, and the series consists of twenty coiled springs, then it will take twenty times four minutes for the whole series to expend its power, or eighty minutes. Theoretically, all the springs acting together give out so little power at a time as to be equivalent only to one-spring power, yet they all cease and the power of the whole series will be expended at about the same time—viz., in eighty minutes of actual employment; but the object and nature of the invention will be more fully hereinafter set forth. Endeavors have been made to accomplish the same objects before by different mechanism; but I consider the hereinafter-described device to be the best calculated to effect the purpose.

Figure 7:
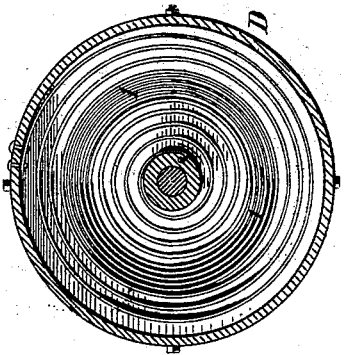
Figure 8:
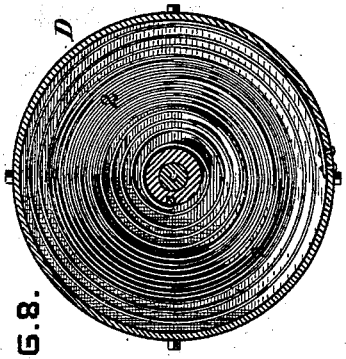
Figure 9:
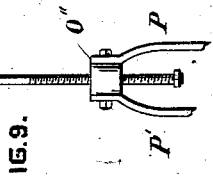
Figure 5:
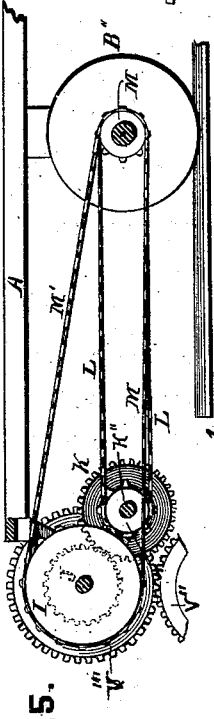
Figure 6:
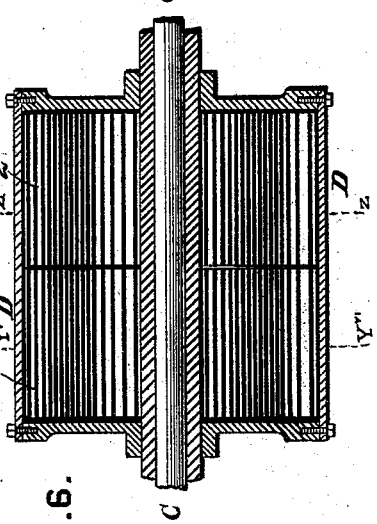

In the drawings, in Sheet 1, Figure 1 is a plan view of the working parts of my device with the body of the car omitted; Fig. 2, an end view of the starting-gear and speed-adjusting gear; Fig. 3, a detached view of the brake. In Sheet 2, Fig. 4 is a longitudinal vertical sectional view of my device on the line X X of Fig. 1; Fig. 5, a detached side view of the starting-gear and the gear for transmitting power to the running-gear or wheels of the car; Fig. 6, an enlarged detached longitudinal sectional view of one of my spring-cylinders, showing the inner contained coiled springs, not wound up, however; Fig. 7, a sectional view of the same on the line $Y^V Y^{VI}$ of Fig. 6, showing the spring wound in one direction; Fig. 8, a similar view on the line Z Z of Fig. 6, showing the spring wound in the contrary direction to that of Fig. 7; Fig. 9, Sheet 2, a detached view of the screw-threaded brake-rod, with a part of a car-dasher; Fig. 10, Sheet 1, a detached view of the levers directly connected with the brake-band for tightening and loosening the same upon the brake-drum.

In Sheet 1, Fig. 1, A is the frame beneath the body of a car, to which my apparatus is attached. B B' are the axles; B'' B''', the wheels of the car; C C, a longitudinal central bar or shaft, sustaining and passing through the loose hollow-shaft sections $C' C'' C''' C^{IV} C^V C^{VI} C^{VII} C^{VIII}$. The section $C^{VIII}$ of the hollow shaft is fast upon the end of rod C. D $D'$ $D''$ $D'''$ $D^{IV}$ $D^V$ $D^{VI}$ are the hollow cylinders or drums containing the spiral springs.

While I have represented the cylinders $D''$ $D'''$ as being separated, they, in fact, constitute but one cylinder, being rigidly joined together by a neck-piece, and are separated only to span the axle B. Each of these drums contains two spiral springs, which I have numbered from 1 to 14. (See Fig. 4, Sheet 2.) The section of hollow shafts $C'$, passing through the centers of the beveled cog-wheels E E', enters half-way into the drum D, the hollow-shaft section $C''$ is half within the drum D and half within the drum D', and thus with all the successive hollow-shaft sections. They each project half-way into one drum and half-way into the neighboring drum, excepting the shaft-section $C^{VIII}$, which terminates the series, and which projects only into one drum, $D^{VII}$. These drums turn freely upon these sections of hollow shafting, excepting in so far as they are restrained by the inner contained coiled springs, each of these springs being secured at its outer end to the inner face of the drum, and at its inner end to the loose hollow shaft. (See Figs. 7 and 8, Sheet 2.) Spring 1, as will be seen in Fig. 7, is wound around its hollow shaft $C'$ from right to left, while the spring 2, in the same drum D, is wound around its hollow shaft $C''$ from left to right. It will be noticed that all these springs—take spring 1, for example—are very wide, or formed of broad bands of steel, as it will be very costly and troublesome to make these large springs, and the loss and trouble resulting from the breaking of any one of them would be great. I contemplate using a number of narrower coiled springs—say two, three, or more—in place of each broad spring 12, &c., each one of said two or three narrower springs to be attached to the hollow shaft and drum in precisely the same manner as the broad spring which they represent, or whose place they take. Thus, if one spring breaks, there will be some remaining ones of its series to perform its functions.

It will be advisable in using narrow-band springs to provide loose round plates or disks of nearly as great diameter as the inner diameter of the drum, which may be slipped upon the hollow shaft between each two springs to prevent the springs from upsetting and interfering one with another. I do not show this device; but it will be understood by any one skilled in the art from the above description.

E E' are two beveled cogs, (see Fig. 4,) rigidly connected at their axes by a sleeve, which envelops and turns with the hollow-shaft section $C'$. This enveloping-sleeve may be pierced with a square or polygonal hole, and that part of the shaft C may be made correspondingly polygonally shaped to fit in the said sleeve, which I will call $E''$, and thus turn the latter with it; or the opening in sleeve E may be furnished with a groove to receive a feather situated upon shaft $C'$. This sleeve, with its two cogs, is capable of a slight movement backward and forward upon the shaft. This motion is imparted to it by the lever F, which is pivoted at $F'$ by a cross-rod, $F''$, (see Fig. 2,) which rod passes through the sleeve $F'$, (see Fig. 2,) the downwardly-projecting rods G G, (see Figs. 2 and 4,) serving to impart said movement by means of a clutch and collar, said collar sitting loosely in a groove around the sleeve $E''$. (Seen in section in Fig. 4 and in front view in Fig. 2.) A short lever-arm, $G'''$, rigidly attached to the sleeve $F'$, (see Fig. 2,) projects downward from the sleeve $F'$, and is jointed at its end to the rod $G^{IV}$, (see Fig. 1,) which rod passes longitudinally to the rear end of the frame A, where it is hinged at $G^V$ to a similar short lever-arm, which arm in its turn is pivoted to an upwardly-projecting lever similar to lever F. This last-mentioned lever I have shown in dotted lines at $G^{VI}$ in Fig. 4, as it does not properly form a part of the sectional view there shown. By moving the lever $G^{VI}$ backward and forward the wheels E E' are moved upon the shaft $C'$, through the intermediary of the rod $G^{IV}$, in the same manner as when they are shifted by the lever F.

H is a beveled cog-wheel, mounted rigidly upon a shaft, $H'$, which is supported from the end of the main frame A. (See Fig. 1.) The beveled cog-wheel H is adapted to gear with the bevel of either cog-wheel E or E'. Loosely upon the same shaft $H'$ is mounted the chain-gear wheel I. The small cog-wheel J is also mounted loosely upon the same shaft $H'$. A short sleeve-coupling, $J'$, slides to and fro on the shaft $H'$, and is turned by the said shaft $H'$ by means of a feather. Slight projections upon each end of this coupling fit into corresponding depressions in the hubs of the loose wheels I J, as this coupling always turns with the shaft; the shifting of the coupling against the hub of wheel I is accomplished in the manner shown in Figs. 1 and 2, so that the projection on the coupling fits into the recess of this wheel, and compels this wheel to turn with this coupling and its shaft, and the wheel J is revolved by shaft $H'$ when the coupling $J'$ is shifted away from the hub of wheel I, so that its other projection engages in the recess in the hub of wheel J. This shifting is effected by the upright pivoted lever $J''$, the lower end of which is secured to the coupling $J'$ by a loose ring or collar fitting in a recess around the coupling.

K is a cog-wheel which engages with the cog J, and is mounted rigidly upon its shaft $K'$, which is supported from the main frame A. (See Fig. 1.) Mounted rigidly upon the same shaft $K'$ is the small chain-gear wheel $K''$. An endless chain, L, passes over the chain-gear wheel $L'$, which latter is mounted rigidly upon the axle B of the car. The revolution of the wheel $L'$ through the chain L will turn the wheel $K''$, and vice versa.

M is a chain-gear wheel or pinion, also set rigidly upon axle B, and an endless chain, $M'$, (see Figs. 1 and 5,) passes over and around both the chain-gear wheels I and M, so that the revolution of the wheel I, by means of the chain M', will turn the wheel M, and consequently the axle B and wheels B'' B'''.

The next part of my device is the brake and speed-adjuster.

N, Fig. 9, Sheet 1, represents a broken section of the top cross-bar of a car-dasher.

N' is the brake-spindle, secured to the dasher somewhat in the usual way, adapted to be turned freely, but secure against vertical motion by means of collars or shoulders O O, or other convenient device.

O' is a hand-wheel to turn the brake-spindle N'. The spindle N' is screw-threaded for a considerable part of its length from its lower extremity, which screw-threaded part engages in a female screw-threaded collar, O''. Two links or connecting-arms, P P', in the form of a yoke, are secured above to the collar O'' by means of studs or screws. These connecting-arms pass down each side of a brake-drum, Q, (see Figs. 2 and 3,) where they are loosely jointed or hinged, each to one of two arms, R R, of a bell-crank lever, R R'. The upright arms l' (see Figs. 3 and 10) are all rigidly attached to a cross-bar, R'', which cross-bar is suspended from the front part of the frame A by two lugs or bearings, S S', (see Fig. 1,) in which its ends are set and turn freely. As the arms R and R' are rigidly connected to the bar R'', the raising of the ends of the arm R R by the upward movement of the links P P' will tend to throw the upper part of arm R' downward, the arms R and R' acting as a "bell-crank," which I have called them.

A steel band, T, passes closely around the brake-drum Q, one end of this band being attached to the bar R'', whence it passes down and closely around the drum Q, and its other end is fastened securely to the upper end of R'. The drum Q is mounted rigidly upon a shaft, U, which is hung from the cross-bar, which forms the front of the main frame A. Upon one end of shaft U is rigidly set a beveled cog, U', similar to the beveled cog H, and directly opposite thereto. This cog U' engages with the beveled cogs E and E', respectively, at the same time and in the same manner as the beveled cog H has been described to do.

It will be plainly seen that the throwing down of the upper end of arm R' will tighten the steel band T, and thus check or regulate the revolution of the latter.

V is a brake-chain, attached at one end to the upper part of the arm R', while the other end, passing under the length of the car, is secured to and wound upon the foot of an ordinary brake spindle, V', in the manner in common use upon street-cars. It will be plainly seen that any tension placed upon this chain V from the brake-spindle V' will tend to draw the upper end of R' in a direction toward the brake-spindle V', and thus tighten the band T upon the drum Q.

A small ratchet-wheel, W, is rigidly set upon the outer end of the shaft H', and a retaining-pawl, W', is hinged to the side of the main frame A, and engages with the teeth of this ratchet to restrain its backward movement. (See Fig. 1.)

Y, Fig. 1, is a stiff round rod or bar, similar to the rod G$^{IV}$. This rod Y, however, is rigidly set at one end into the pivotal point of lever J'', (see Fig. 2,) while at its other end, Y', it is attached to an ordinary vibrating lever, the lateral movement of the upper end of which will partially turn or revolve the rod Y, whereby the lever J'' will be so actuated as to shift the coupling J' from the hub of one of the wheels I or J to that of the other, in the manner described above as being accomplished by the operation of lever J''.

V'', Fig. 5, shows a broken view of a cog-wheel, which, being set beside the car-track, gears into cog-wheel V''' when the car is run to a position over it. Cog-wheel V''' is rigid upon shaft H', and this cog-wheel V'' is then turned by power from an engine to wind up the springs of the motor.

I have thus set forth the detailed construction of my device, and will now describe its operation and the relation of the various parts to each other.

First, as to the storage of power in the springs at either terminus of the road. The winding-up is accomplished by means of a stationary engine. A cog-wheel, V'', connected with the engine, engages with the cog-wheel V'''. (See Figs. 1 and 5.) The coupling J', having been shifted into its center position, so that it is engaged with neither of the wheels I or J, will allow the shaft H' and the bevel-cog H to turn freely. That cog-wheel E or E' by the revolution of which the first spring, 1, Fig. 4, will be wound up from the center is shifted by the lever F against the beveled cog-wheel H. The cog wheel V''', turned by the cog-wheel V'', which connects with the engine, then revolves shaft H', beveled cog-wheel H, and, I will say, beveled cog-wheel E. (See Fig. 1.) The revolution of cog-wheel E (see Fig. 4, Sheet 2) will turn the loose shaft-section C'. This will wind up spring 1 from the center, the said spring being attached to said shaft-section at its center. As the tension of spring 1 increases, there will be a tendency to turn the drum D in the same direction; as spring 1 is being wound, the drum will turn in that direction. Now, as spring 2 is coiled in a direction opposite to that of spring 1, the revolution of the drum D will draw the outer end of spring 2 around with it, and so begin the coiling and tightening of spring 2 from the outer end of the spring. As spring 2 becomes more tense, it will in its revolution begin to turn the loose shaft-section C'' in the same direction in which it is traveling. This will begin to wind up spring 3 from the center thereof, as spring 3 is coiled in a direction opposite to that of spring 2. As spring 3 increases in tension, it will turn drum D' with it and begin winding up spring 4 from the outer end of spring 4. Spring 4 in turn communicates motion to shaft-section C''', which will wind up spring 5 from the center. This will in its turn have the effect of carrying around drums D'' D''', which are rigidly connected and practically constitute one drum, and thus the spring 6 will be wound up from its outer end, and thus the action is sustained throughout the whole series of shafts, springs, and drums until the shaft C$^{VIII}$ is reached, which is stationary, and simply permits its spring to be wound tightly upon it, said winding beginning at the outer end of the spring 14.

If, in the course of winding the springs, some of the first of the series become tightly wound up before the winding of the other ones is completed, it is no detriment to the carrying on of the operation, for the loose shaft-sections being free to turn upon the binding-rod C, which passes though them, the shafts and drums will continue to turn until the last spring, 14, is wound tightly up. When this result is accomplished the brake-band T is tightened upon the brake-drum Q, and the retaining-pawl W', whose office, by means of the ratchet W, was to prevent any backward action or turning of shaft K, is released from the said ratchet and thrown back. The tightening of the brake-band T is accomplished by turning the hand-wheel O', Fig. 9, which turns the spindle N' and draws up the screw-threaded collar O''. Arms or links P P' raise the arms R R and throw down the upper end of arm R'. This tightens the band T upon the drum Q and checks the revolution of the latter and of its shaft U. The beveled cog U' upon shaft U engages with that large beveled cog-wheel E or E', through the intermediary of which the springs are wound up from the small beveled cog H. Any revolution of said large beveled cog-wheel E or E' is completely checked by the holding of beveled cog U' by the brake-drum Q. The cog-wheel from the engine is then disconnected from the cog-wheel K, and the car is ready for use. The action of the unwinding of the springs or the expenditure of the power thus stored in them is simply the reverse of that by which they were wound up, the time of the accomplishment of their complete unwinding being regulated and controlled, however, by the tension or degree of friction of the brake-band T upon the brake-drum Q.

When it is desired to start the car the pressure of the brake-band upon the drum Q is eased or partially relieved by so turning the hand-wheel O', as to force down the collar O'' and arms P P', thus throwing up the end of arm R'. By means of the lever F that beveled wheel E or E' is shifted against the beveled wheels H and U, which will so turn the beveled wheel H and its shaft H' that, through the intermediary of the cog-wheels J K, chain-wheel K'', chain L, and chain-wheel L' upon the axle B, the car, when it is started, will proceed in the direction desired. When the pressure of the band T is released from brake-drum Q the power of the springs is exerted to start the car. After the car is started its speed is regulated by the increased or diminished pressure of band T upon drum Q, which, by regulating the speed of the revolution of the drum, will regulate the speed at which the large beveled cog is allowed to turn in its contact with the small beveled cog U'. This will regulate the speed at which cog H is revolved, and consequently the speed at which the car will travel. By means of the lever J'' the coupling J' will now be shifted into contact with the hub of the wheel I. The revolution of the shaft H', as it turns said coupler J', will thus impart motion to the wheel I and drive the car, through the intermediary of the endless chain M' and chain-wheel M, which latter is rigidly set upon the axle B of the car. At any time when it is desired to check the motion of the car or stop it, the result can be accomplished by increasing the pressure of band T upon brake-drum Q.

If it is desired to reverse the motion of the car, the lever F is used to throw that beveled cog E or E', previously out of gear, into contact with the beveled cog H, which action throws the other beveled cog, E or E', which was previously in gear with said cog H, out of gear therewith.

In running down steep grades it will sometimes be an advantage to reverse the gearing, as above described, so that the weight and momentum of the car may have a tendency to wind the springs up again, thus storing or saving the power otherwise lost in braking. This may also be accomplished, in some degree, by so reversing the gearing when it is desired to stop the car. The momentum of the car will tend to wind up the springs.

It will be apparent that the car can be operated from either end. Supposing the operator to be at that end of the car at which the brake-spindle V', Fig. 1, is situated, he can control the brake-band T by tightening or loosening the tension upon the chain V by winding or unwinding the chain V upon the brake-spindle V' in the manner above described. He can also reverse the motion of the car by means of the lever G$^{VI}$, Fig. 4, acting through its pivoted point G$^V$ upon the rod G$^{IV}$, (see Fig. 1,) upon the short lever-arm G''', (see Fig. 2,) to reverse the gearing E E', in the manner described. Said operative can, in the manner described above, turn the rod or bar Y from the point Y', whereby he can throw the coupling J' into gear with either the hub of wheel J or the hub of wheel I, in the manner and for the purposes hereinabove set forth.

While I have shown only fourteen springs in my series, it is very evident that the number can be increased proportionately to the length of the car. I have shown my series of springs arranged in one line from one end of the car to the other; but it will be apparent to any skilled mechanic that a number of supporting-rods C may be arranged transversely of the length of the car, upon which rods can be mounted the hollow shafting C' C'' C''', &c., and the drums D D', &c., with the inclosed springs, and as the springs are wound up from one end motion can be communicated from the hollow shafting from one bar C to that upon the next bar C by means of cog, chain, or belt gearing.

I would also mention that, instead of arranging my springs as shown in Figs. 1 and 4, I can double the number of springs by arranging them in two parallel longitudinal lines. Suppose, for instance, that another longitudinal series of springs were arranged parallel to those shown in Figs. 1 and 4. In such case the hollow shaft $C^{VIII}$, Fig. 4, would be arranged to turn loosely upon its rod C, and upon its outer end a cog-wheel or other gearing would be fixed to communicate motion to the first opposite hollow shaft of the other parallel series, which latter parallel series of hollow shafts would terminate at that end of the car opposite to that at which $C^{VIII}$ is now shown to terminate, and in the same manner that the shaft $C^{VIII}$ is constructed and arranged, as shown in the illustration, Figs. 1 and 4. The power which I propose that each of my springs—say spring 1—will possess shall be equal to that derived from a tightly-coiled steel spring about fifty feet long, twelve inches broad, and one-quarter of an inch thick, and this whether the whole width of spring be made up of several narrow springs, as above set forth, or of one band of the width of twelve inches. A spring of such dimensions is capable of driving an ordinary street-car, and I propose by means of my brake to so control the expenditure of the force stored up in my whole series of springs that the force exerted at one time is equal only to that of one spring, so that when the force of the whole series of springs is expended the time consumed in so doing will be equal to that consumed in the expenditure of the force of one spring multiplied by the number of springs composing the series. The cog-wheel K, being larger than the cog-wheel J, will, when turned, impart a rapid motion to the cog-wheel J and will rapidly wind up the springs. Now, in running the car, it will be important, for the sake of speed, to drive the car from the springs by means of a large wheel, I, driving a small one, M, situated upon the axle B. Therefore when the car is started the coupling J' is shifted against the hub of wheel I, as described.

As will be seen, the rods Y and $G^{IV}$ of chain V enable an operative stationed at that end of the car most distant from the gearing to shift the coupling G', to reverse the gearing, and to regulate the speed or to stop the car.

What I claim as new is—

1. In a spring-motor, the combination of a series of hollow drums, D D' D'', alternately differentially coiled springs 1 2 in each drum, hollow-shaft sections C' C'' C''', said springs being attached at their inner ends to said hollow-shaft sections and at their outer ends to the interior of said drums each of said hollow-shaft sections projecting half-way into one of said drums, all mounted upon a central supporting-bar, C, with suitable mechanism for turning the first of said series of hollow-shaft sections, said drums turning freely upon said hollow-shaft sections, and the latter turning freely upon said supporting-bar C, all combined and operating substantially as set forth.

2. In a spring-motor, the combination of the drums D D', &c., springs 1 2 3, &c., shaft-sections C' C'' C''', &c., central supporting-shaft, C, cogs E, E', and H, chain-wheels I and M, the latter being located upon the axle of the car to drive the same, and the endless chain M', substantially as described.

3. In a spring-motor, the combination, with the driving mechanism E E' H, actuated by suitable springs, as described, of the cog-wheels J K, mounted upon suitable shafts. H' K', respectively, chain-wheel K'' upon shaft K', chain-wheel L', mounted upon the axle B of the car, and endless chain L, all arranged, substantially as described, to start the car, after the springs have been wound up, by power applied to the wheel K, substantially as set forth.

4. In a spring-motor, the combination, with the driving mechanism E E' H, actuated by suitable springs, as described, of chain-wheels I M, mounted as described, with their chain M', chain-wheels K'' L', mounted as described, with their endless chain L, and cog-wheels J K, as shown, the cog-wheel J being mounted loosely upon the same shaft as chain-wheel I, and adapted to be thrown into or out of gear by the intermediate coupling, J', actuated by the lever J'', substantially as and for the purposes described.

5. In a spring-motor, the combination, with the driving cog-wheel mechanism E E' H, actuated by suitable springs, said cog-wheels E E' being rigidly jointed together and mounted loosely upon their shaft C, but turning therewith by means of a feather or spline, of the shifting mechanism F F' G G, adapted to shift one or other of said wheels E E' into gear with the bevel cog-wheel H, substantially as and for the purposes described.

6. In a spring-motor, the combination of the driving mechanism E E' H, actuated by suitable springs, as described, the cog U', joining with the said driving mechanism and mounted upon a suitable shaft, U, upon which latter is rigidly set the friction-brake drum Q, which is regulated in its revolution by the pressure of the enveloping band T, and a suitable mechanism, N O O'' P P' R R', to tighten and loosen the said band T upon the brake-drum Q, substantially as described.

7. In a spring-motor, the combination, with the chain-wheel I, cog J, and shifting coupling J', situated at one end of a car, of the rod Y, secured rigidly to the shifting-lever J'', as described, passing under the length of the car and secured to its other end, a lever, Y', whereby the coupling J' can be shifted by means of a rod, Y, from that end of the car opposite to which it is situated, whereby the coupling J' can be shifted by an operative from either end of the car, substantially as described.

8. In a spring-motor for cars, the combination, with the driving mechanism E E' H, actuated by suitable springs, of reversing mechanism F F' G, furnished with a suitable lever, G''', to the end of which is attached a stiff rod, G$^{IV}$, extending from the lever G''' to the other end of the car, where it is furnished with a lever-arm, G$^{VI}$, by means of which the rod is moved backward and forward, thus actuating the lever G''' and reversing the gearing in the same manner as is done by the lever F, whereby the motion of the car can be reversed by an operative stationed at either end thereof, substantially as and for the purpose described.

9. In combination with a spring car-motor, the brake and speed-adjusting mechanism consisting of the brake-drum Q, a pressure-band, T, situated at one end of the car, and the chain V, passing from the end of the band T under the length of the car to the other end thereof, where it is wound upon the brake-spindle V', whereby the speed of the car can be regulated, or can be stopped or started from either end of the car, substantially as described.

10. A mechanism for winding up the springs of a spring car-motor, consisting of a cog-wheel, V''', connected by suitable shafts and gearing with the springs of the motor, and a cog-wheel, V'', arranged in such a place that when the car is moved over it its teeth will engage with those of the cog-wheel V''', power being communicated to said cog-wheel V'' from a stationary engine, whereby, when the cog-wheel V'' is turned, it will turn the cog-wheel V''', whereby, through the said intermediary gearing, the springs will be wound up, substantially as described.

GEORGE JIENCKE.

Witnesses:
GEORGE E. BUCKLEY,
WM. H. CARSON.